United States Patent
Casimiro et al.

(10) Patent No.: US 12,516,228 B2
(45) Date of Patent: Jan. 6, 2026

(54) ADHESIVE COMPOSITION COMPRISING LIGHTENED FILLERS

(71) Applicant: Bostik SA, Colombes (FR)

(72) Inventors: Jessie Casimiro, Brie Comte Robert (FR); Audrey Soukhavong, Brie Comte Robert (FR); Herve Barberi, Brie Comte Robert (FR)

(73) Assignee: BOSTIK SA, Colombes (FR)

( * ) Notice: Subject to any disclaimer, the term of this patent is extended or adjusted under 35 U.S.C. 154(b) by 516 days.

(21) Appl. No.: 18/001,893

(22) PCT Filed: Jun. 17, 2021

(86) PCT No.: PCT/FR2021/051092
§ 371 (c)(1),
(2) Date: Dec. 15, 2022

(87) PCT Pub. No.: WO2021/255393
PCT Pub. Date: Dec. 23, 2021

(65) Prior Publication Data
US 2023/0295478 A1    Sep. 21, 2023

(30) Foreign Application Priority Data

Jun. 18, 2020 (FR) ...................................... 2006351

(51) Int. Cl.
*C09J 11/04* (2006.01)
*C09J 11/08* (2006.01)
*C09J 133/10* (2006.01)

(52) U.S. Cl.
CPC ............. *C09J 133/10* (2013.01); *C09J 11/04* (2013.01); *C09J 11/08* (2013.01); *Y10T 428/28* (2015.01); *Y10T 428/2891* (2015.01)

(58) Field of Classification Search
None
See application file for complete search history.

(56) References Cited

U.S. PATENT DOCUMENTS

| | | | | |
|---|---|---|---|---|
| 3,615,972 A | * | 10/1971 | Morehouse, Jr. | ........... C08J 9/32 523/210 |
| 2013/0168018 A1 | * | 7/2013 | Casimiro | ................ C08L 33/08 156/331.7 |
| 2015/0353783 A1 | * | 12/2015 | Casimiro | ............... C09J 107/00 156/247 |
| 2019/0031927 A1 | | 1/2019 | Casimiro et al. | |

FOREIGN PATENT DOCUMENTS

| | | | |
|---|---|---|---|
| DE | 102008013020 A1 | 9/2009 | |
| KR | 100830707 B1 | 5/2008 | |
| KR | 100924675 B1 | 11/2009 | |
| WO | 2002044255 A1 | 6/2002 | |
| WO | WO-2020132176 A1 * | 6/2020 | ................ C09J 7/22 |

OTHER PUBLICATIONS

ISA/EP, International Search Report and Written Opinion for corresponding International Patent Application No. PCT/FR2021/051092, mailed Oct. 7, 2021, 7 pages.

* cited by examiner

*Primary Examiner* — Anish P Desai
(74) *Attorney, Agent, or Firm* — Rimon P.C.; Allyn B. Elliott

(57) ABSTRACT

The present invention relates to an adhesive composition comprising a polymer composition, lightened fillers, carbonate fillers; and a tackifying resin, and also to its use for applying a flexible surface covering to a substrate and to a corresponding bonding process.

15 Claims, No Drawings

ADHESIVE COMPOSITION COMPRISING LIGHTENED FILLERS

CROSS-REFERENCE TO RELATED APPLICATIONS

This application is a U.S. National Stage application of International Patent Application No. PCT/FR2021/051092, filed on Jun. 17, 2021, which claims the benefit of French Patent Application No. FR2006351, filed on Jun. 18, 2020.

FIELD OF THE INVENTION

The present invention relates to an adhesive composition and also to its use for applying a flexible surface covering to a substrate and to a corresponding bonding process.

TECHNICAL BACKGROUND

In the field of construction and interior decoration, it is known practice to cover a substrate, in particular a flat surface, with a specific covering so as to give it particular properties, notably for energetic, thermal, acoustic or esthetic, etc. reasons.

The substrate to be covered may be a floor, a wall or a ceiling, in particular a floor. It may be a raw substrate, for example a cement substrate or a substrate made of wood panels, or a substrate that has undergone a finishing treatment, for example a screed floor or a levelling coat.

Various types of coverings are known, namely flexible surface coverings and rigid surface coverings. Flexible surface coverings correspond to polymeric coverings, such as PVC coverings (homogeneous PVC, heterogeneous PVC and LVT) and carpeting. Rigid surface coverings notably correspond to tiles and parquet.

To ensure good adhesion, adhesive compositions (commonly called glues) are applied between the substrate to be covered and the surface covering. Various compositions are generally applied depending on the type of surface covering used. In particular, when the surface is covered with a flexible surface covering, such as a polymeric covering or carpeting, it is recommended to use an adhesive composition which enables homogeneous adhesion of the surface covering without folds. Various adhesive compositions are currently available. Although these compositions may be suitable for applying a flexible surface covering to the substrate and have satisfactory mechanical properties, their use may be restrictive. These adhesive compositions may be difficult to apply, requiring mastery of the laying technique and correct training. These adhesive compositions may also require the application of a large amount of composition by weight and volume per square meter, which increases the cost price per square meter and/or requires a large storage capacity.

Adhesive compositions, for various applications, are already known. Compositions are disclosed, for example, in the following documents: DE 102008013020 A1, WO 2002/044255 A1 and KR 100830707 B1.

However, there is still a need to provide an adhesive composition, notably for laying a flexible surface covering on a substrate, which is easy to apply, while at the same time maintaining good mechanical cohesive properties.

There is also a need to provide an adhesive composition, notably for laying a flexible surface covering on a substrate, with improved application efficiency, in order to reduce the cost price per square meter. In particular, there is a need to provide an adhesive composition with improved application efficiency, without compromising the stability of the composition over time and/or the application and adhesion performance. There is thus also a need to provide an adhesive composition that is easy to transport, deliver and handle on the work site.

SUMMARY OF THE INVENTION

The invention relates firstly to an adhesive composition, for applying a flexible surface covering to a substrate, comprising, relative to the total weight of the adhesive composition:
- from 10% to 40% by weight of solids of a polymer composition comprising at least one copolymer or a mixture of at least two polymers comprising at least one (meth)acrylate or (meth)acrylic monomer;
- from 0.075% to 1.5%, preferentially from 0.15% to 1.2%, very preferentially from 0.15% to 0.75%, by weight of solids of at least one lightened filler having a bulk density of less than or equal to 0.1 $g/cm^3$; preferentially from 0.01 to 0.1 $g/cm^3$; very preferentially from 0.01 to 0.07 $g/cm^3$;
- optionally at least a second lightened filler having a bulk density of greater than 0.1 $g/cm^3$ and less than or equal to 0.95 $g/cm^3$; preferentially from 0.15 to 0.70 $g/cm^3$; very preferentially from 0.20 to 0.50 $g/cm^3$;
- from 15% to 60% by weight of at least one carbonate filler; and
- from 6% to 30% by weight of at least one tackifying resin.

In certain embodiments, the composition comprises from 15% to 35%; preferentially from 20% to 30%; by weight of solids, relative to the total weight of the adhesive composition, of a polymer composition comprising at least one copolymer or a blend of two polymers comprising at least one (meth)acrylate or (meth)acrylic monomer.

In certain embodiments, the polymer composition comprises from 35% to 70%; preferentially from 45% to 65%; very preferentially from 50% to 63%; even more preferentially from 58% to 62%, by weight of a copolymer or a blend of at least two polymers comprising at least one (meth)acrylate or (meth)acrylic monomer, relative to the total weight of the polymer composition.

In certain embodiments, the lightened fillers are hollow, nonporous, water-dispersible microspheres having a mean particle size (D50) of from 1 to 100 μm; preferentially from 25 to 70 μm.

In certain embodiments, the lightened fillers having a bulk density of less than or equal to 0.1 $g/cm^3$ are hollow microspheres obtained from a thermoplastic material; preferentially from polymers derived from ethylenic hydrocarbons.

In certain embodiments, the second lightened fillers, having a bulk density of greater than 0.1 $g/cm^3$ and less than or equal to 0.95 $g/cm^3$, are hollow microspheres obtained from silica glass.

In certain embodiments, the tackifying resin is chosen from rosins of natural or modified origin, and hydrogenated, dimerized, polymerized or esterified derivatives thereof with monoalcohols or polyols.

In certain embodiments, the carbonate filler has a bulk density of greater than 0.95 $g/cm^3$; preferentially from 1.1 to 1.9 $g/cm^3$; very preferentially from 1.3 to 1.7 $g/cm^3$.

In certain embodiments, the carbonate filler is chosen from alkali metal or alkaline-earth metal carbonates; preferentially from calcium carbonate and magnesium carbonate; very preferentially, the carbonate filler is calcium carbonate.

In certain embodiments, the composition comprises a solids mass ratio of lightened fillers to total fillers of from 1:100 to 15:100; preferentially from 1:100 to 10:100.

In certain embodiments, the composition comprises a thickener, a plasticizer, a solvent, a pigment, a moisture absorber, a UV stabilizer, a dispersant, a molecular sieve, an antifoam, a fluorescent material, a biocide and mixtures thereof.

In certain embodiments, the composition has a viscosity of from 10 000 to 45 000 mPa·s; preferentially 20 000 to 35 000 MPa·s.

The invention relates secondly to a process for applying a flexible surface covering to a substrate, comprising the following steps:
 applying a layer of adhesive composition described above to the substrate and/or the flexible surface covering; and
 applying the flexible surface covering to the substrate.

In certain embodiments, an amount of adhesive composition of less than or equal to 290 g/m², preferentially less than or equal to 280 g/m², very preferentially less than or equal to 270 g/m², is applied.

The invention relates thirdly to the use of the adhesive composition described above for applying a flexible surface covering to a substrate; preferentially for applying a flexible surface covering chosen from polymeric coverings or carpeting to a floor.

The present invention makes it possible to overcome the drawbacks of the prior art. More particularly, it provides an adhesive composition having satisfactory adhesion performance, satisfactory stability over time and satisfactory mechanical cohesive properties. The application of this composition is also facilitated. In addition, the application efficiency of this composition is improved, which reduces its cost price per square meter, relative to the known adhesive compositions. Finally, the transport, delivery and handling of the adhesive composition on work sites, relative to known adhesive compositions, are facilitated.

Specifically, the inventors have demonstrated that the formulation of an adhesive composition according to the invention-notably in that it comprises at least one carbonate filler, at least one lightened filler having a bulk density of less than or equal to 0.1 g/cm³ and optionally at least a second lightened filler having a bulk density of greater than 0.1 g/cm³ and less than or equal to 0.95 g/cm³—was particularly satisfactory for enabling the adhesion of a flexible surface covering to a substrate, and that it had the advantages presented above. In particular, the inventors have demonstrated, surprisingly, that the incorporation of specific lightened fillers in partial replacement for conventional fillers facilitated the application thereof and improved its application efficiency, without reducing its adhesion performance, its stability over time or its mechanical cohesion properties.

DETAILED DESCRIPTION

The invention is now described in greater detail and in a nonlimiting manner in the description that follows.

The term "bulk density" (or "apparent density") means the bulk density measured via conventional methods well known to those skilled in the art, for example by weighing a given volume as described below. The bulk density is defined as the ratio between the mass of the material and the apparent volume of all the grains. The bulk density is expressed in g/cm³.

The term "lightened filler" means a filler with a bulk density of less than or equal to 0.95 g/cm³.

The term "mean particle size", including fillers or hollow microspheres, means the size measurement for a volume particle size distribution and corresponding to 50% by volume of the sample of particles analyzed. When the particles are spherical, the mean particle size corresponds to the median diameter (D50 or Dv50) which corresponds to the diameter such that 50% by volume of the particles have a size expressed in micrometers and determined according to the standard NF ISO 13320-1 (1999) by laser diffraction on apparatus of Malvern type.

The term "sphere" or "spherical", including the fillers or hollow microspheres, means a particle having an aspect ratio close to 1, ranging from 0.5 to 1.5, for example such as oblong, ovoid or ellipsoidal particles, and preferably equal to 1, i.e. having a spherical shape. Such an aspect ratio is defined as the ratio of the maximum distance between two points on the surface of the particle, along a main direction, to the minimum distance between two points on the surface of the particle, along a direction substantially perpendicular to the main direction.

Adhesive Composition

In a first aspect, the present invention relates to an adhesive composition, for the application (bonding) of a flexible surface covering to a substrate, comprising, relative to the total weight of the adhesive composition:
 from 10% to 40% by weight of solids of a polymer composition comprising at least one copolymer or a mixture of at least two polymers comprising at least one (meth)acrylate or (meth)acrylic monomer;
 from 0.075% to 1.5%, preferentially from 0.15% to 1.2%, very preferentially from 0.15% to 0.75%, by weight of solids of a lightened filler having a bulk density of less than or equal to 0.1 g/cm³;
 optionally at least a second lightened filler having a bulk density of greater than 0.1 g/cm³ and less than or equal to 0.95 g/cm³;
 from 15% to 60% by weight of a carbonate filler; and
 from 6% to 30% by weight of at least one tackifying resin.

Polymer Composition

The copolymers or polymer blends used in the invention to form the polymer composition may be in the form of an aqueous dispersion, or an aqueous emulsion, or a redispersible powder which, after adding water, forms an aqueous solution; preferentially in the form of an aqueous dispersion. The form in which the copolymer or polymer blend is used depends on its solubility in water.

The incorporation of these polymer compositions is advantageous in that it further increases the cohesion of the adhesive composition and thus further improves its mechanical performance.

The adhesive composition comprises from 10% to 40%; preferentially from 15% to 35%; very preferentially from 20% to 30%; by weight of solids, relative to the total weight of the adhesive composition, of a polymer composition comprising at least one copolymer or a blend of two polymers comprising at least one (meth)acrylate or (meth)acrylic monomer.

The term "copolymer comprising at least one (meth)acrylate or (meth)acrylic monomer" means a polymer formed from at least two monomers, including at least one (meth)acrylate or (meth)acrylic monomer.

The term "polymer blend comprising at least one (meth)acrylate or (meth)acrylic monomer" means a blend comprising at least two polymers of which at least one polymer is formed from (meth)acrylate or (meth)acrylic monomers.

The (meth)acrylate or (meth)acrylic monomer may be chosen from acrylic acid, methacrylic acid, methyl acrylate, methyl methacrylate, ethyl acrylate, ethyl methacrylate, butyl acrylate, butyl methacrylate, isobutyl acrylate, isobutyl methacrylate, n-hexyl acrylate, n-hexyl methacrylate, ethylhexyl acrylate, ethylhexyl methacrylate, n-heptyl acrylate, n-heptyl methacrylate, stearyl acrylate, stearyl methacrylate, glycidyl methacrylate, acrylamide, methacrylamide, hydroxyethyl acrylate, hydroxyethyl methacrylate, allyl methacrylate, cyclohexyl acrylate, cyclohexyl methacrylate, 2-ethoxyethyl acrylate, 2-ethoxyethyl methacrylate, isodecyl acrylate, isodecyl methacrylate, 2-methoxy acrylate, 2-ethoxy methacrylate, 2-(2-ethoxyethoxy)ethyl acrylate, 2-phenoxyethyl acrylate, 2-phenoxyethyl methacrylate, isobornyl acrylate, isobornyl methacrylate, caprolactone acrylate, caprolactone methacrylate, polypropylene glycol monoacrylate, polypropylene glycol monomethacrylate, polyethylene glycol acrylate, polyethylene glycol methacrylate, benzyl acrylate, benzyl methacrylate, or mixtures thereof.

The copolymer or polymer blend comprising at least one (meth)acrylate or (meth)acrylic monomer may comprise at least one other monomer chosen from vinyl acetate, vinylethylene, styrene, vinyl chloride, vinyl versatate, vinyl laurate or combinations thereof.

The copolymer or blend of at least two polymers comprising at least one (meth)acrylate or (meth)acrylic monomer may have a glass transition temperature (Tg) of from −50 to 0° C.; preferentially from −40 to ~10° C.; very preferentially from −37 to ~15° C. In a conventional manner, well known to those skilled in the art, the glass transition temperature may be measured by DSC (Differential Scanning calorimetry).

The adhesive composition may also comprise at least one other polymer chosen from polyesters, polyurethanes or mixtures thereof.

The adhesive composition may comprise from 0 to 15%; preferentially from 0 to 10%; very preferentially from 0 to 5%; by weight of said other polymer chosen from polyesters, polyurethanes or mixtures thereof relative to the total weight of the adhesive composition.

The polymer composition may also comprise at least one other polymer which is a copolymer of vinyl acetate and ethylene. This copolymer of vinyl acetate and ethylene may be present in the polymer composition or may be added separately to the adhesive composition.

The adhesive composition may comprise from 0 to 15%; preferentially from 0 to 10%; very preferentially from 0 to 5%; of a copolymer of vinyl acetate and ethylene relative to the total weight of the adhesive composition.

The polymer composition, for incorporation into the adhesive composition, may comprise from 35% to 70%; preferentially from 45% to 65%; very preferentially from 50% to 63%; even more preferentially from 58% to 62%, by weight of a copolymer or a blend of at least two polymers comprising at least one (meth)acrylate or (meth)acrylic monomer, relative to the total weight of the polymer composition (before blending).

For example, polymer compositions that may be used for the preparation of the adhesive composition according to the invention are commercially available, notably the following polymer compositions:

Plextol® D 306 (available from Synthomer): aqueous dispersion of pure acrylic resin based on n-butyl acrylate (98%) and styrene (2%) having a glass transition temperature of −30° C.;

Vinnapas® EAF 68 (available from Wacker): aqueous dispersion of acrylic resin based on vinyl acetate, ethylene and acrylate with a glass transition temperature of −35° C.

Lightened Fillers

The composition according to the invention comprises from 0.075% to 1.5%, preferentially from 0.15% to 1.2%, very preferentially from 0.15% to 0.75%, by weight of solids of a lightened filler having a bulk density (solids) of less than or equal to 0.1 g/cm$^3$. For example, the composition may comprise from 0.075% to 0.15%, or from 0.15% to 0.3%; or from 0.3% to 0.45%; or from 0.45% to 0.6%; or from 0.6% to 0.75%; or from 0.75% to 0.9%; or from 0.9% to 1.05%; or from 1.05% to 1.2%; or from 1.2% to 1.35%; or from 1.35% to 1.5% by weight of solids of at least one lightened filler having a bulk density (solids) of less than or equal to 0.1 g/cm$^3$.

The composition may also comprise, preferentially from 0 to 5%, very preferentially from 0 to 4%, more preferentially from 0 to 3%, of at least a second lightened filler having a bulk density (solids) of greater than 0.1 g/cm$^3$ and less than or equal to 0.95 g/cm$^3$. For example, the composition may comprise from 0 to 0.25%, or from 0.25% to 0.5%; or from 0.5% to 0.75%; or from 0.75% to 1%; or from 1% to 1.25%; or from 1.25% to 1.5%; or from 1.5% to 1.75%; or from 1.75% to 2%; or from 2% to 2.25%; or from 2.25% to 2.5%; or from 2.5% to 2.75%; or from 2.75% to 3%; or from 3% to 3.25%; or from 3.25% to 3.5%; or from 3.5% to 3.75%; or from 3.75% to 4%; or from 4% to 4.25%; or from 4.25% to 4.5%; or from 4.5% to 4.75%; or from 4.75% to 5% by weight of solids of at least a second lightened filler having a bulk density (solids) of greater than 0.1 g/cm$^3$ and less than or equal to 0.95 g/cm$^3$.

In one embodiment, the composition is free of a lightened filler other than the lightened filler having a bulk density (solids) of less than or equal to 0.1 g/cm$^3$, and it is notably free of a lightened filler having a bulk density (solids) of greater than 0.1 g/cm$^3$ and less than or equal to 0.95 g/cm$^3$.

In an alternative embodiment, the composition comprises, as lightened fillers, at least one lightened filler having a bulk density (solids) of less than or equal to 0.1 g/cm$^3$ and at least one lightened filler having a bulk density (solids) of greater than 0.1 g/cm$^3$ and less than or equal to 0.95 g/cm$^3$. In this embodiment, the composition may then comprise from 0.1% to 5%, very preferentially from 0.5% to 4%, more preferentially from 0.5% to 3%, of at least a second lightened filler having a bulk density (solids) of greater than 0.1 g/cm$^3$ and less than or equal to 0.95 g/cm$^3$.

The addition of at least one lightened filler having a bulk density of less than or equal to 0.1 g/cm$^3$, and optionally at least a second lightened filler having a bulk density of greater than 0.1 g/cm$^3$ and less than or equal to 0.95 g/cm$^3$, to the adhesive composition-notably in combination with a polymer composition, at least one carbonate filler and at least one tackifying resin—is particularly advantageous in that the density of the total filler of the composition, and thus its weight, are reduced without, however, and surprisingly, degrading the cohesion of the adhesive composition, its stability or its mechanical properties. In addition, the inventors have demonstrated, surprisingly, that the addition of these lightened fillers facilitates the application of the adhesive composition to the substrate to be covered and/or the surface covering to be laid. Finally, the inventors have demonstrated, surprisingly, that the addition of these lightened fillers also improves the application efficiency.

The lightened fillers are preferentially water-dispersible.

The lightened fillers are preferentially nonporous. This is reflected by the fact that they do not absorb liquids, such as the water present in the adhesive composition according to the invention.

The lightened fillers are preferentially hollow microspheres. The hollow microspheres preferably comprise an inert gas or gas mixture such as air or isobutane, at a gas pressure of from $0.3 \times 10^5$ to $7 \times 10^5$ at 23° C. The gas is trapped during the process of manufacturing the hollow microspheres. The hollow microspheres may have a single internal cavity (single-cell hollow microspheres) or alternatively multiple internal cavities (polycellular hollow microspheres such as perlite). The hollow microspheres preferentially have an outer wall, delimiting the interior of the internal cavity and the outer surface of the hollow microsphere, of substantially homogeneous and sufficient thickness to withstand the shocks associated with the handling of these compounds during the preparation of the adhesive composition, and to ensure leaktightness with respect to the gas contained in the microsphere. The lightened fillers, in particular the hollow microspheres, may have a mean particle size (D50) of from 1 to 100 μm; preferentially from 25 to 70 μm.

In a particular embodiment, the lightened fillers are hollow, nonporous, water-dispersible microspheres having a mean particle size (D50) of from 1 to 100 μm; preferentially from 25 to 70 μm.

The hollow microspheres may be prepared via well-known manufacturing processes. For example, the hollow polymer microspheres may notably be prepared via a process as described in patent application U.S. Pat. No. 3,615,972. The first lightened filler has a bulk density of less than or equal to 0.1 g/cm$^3$; preferentially from 0.01 to 0.1 g/cm$^3$; very preferentially from 0.01 to 0.07 g/cm$^3$. For example, the first lightened filler may have a bulk density of from 0.01 to 0.02 g/cm$^3$; or from 0.02 to 0.03 g/cm$^3$; or from 0.03 to 0.04 g/cm$^3$; or from 0.04 to 0.05 g/cm$^3$; or from 0.05 to 0.06 g/cm$^3$; or from 0.06 to 0.07 g/cm$^3$; or from 0.07 to 0.08 g/cm$^3$; or from 0.08 to 0.09 g/cm$^3$; or from 0.09 to 0.1 g/cm$^3$.

The first lightened filler may be hollow microspheres having a bulk density of 0.1 g/cm$^3$; preferentially from 0.01 to 0.1 g/cm$^3$; very preferentially from 0.01 to 0.07 g/cm$^3$. These hollow microspheres may be obtained from a thermoplastic material; preferentially from polymers derived from ethylenic hydrocarbons (e.g. polyethylene, polystyrene, vinyl chloride or mixtures thereof). These hollow microspheres may be prepared in the form of an aqueous dispersion.

The first lightened filler may be incorporated in the form of an aqueous dispersion. The formulation in the form of an aqueous dispersion facilitates the workability of these fillers.

For example, hollow microspheres obtained from a thermoplastic material are commercially available under the name Expancel® by Nouryon in the form of aqueous dispersions (15% by weight of hollow microspheres, bulk density [solids] of 0.036 g/cm$^3$).

When the first lightened filler is in the form of an aqueous dispersion, for example a dispersion comprising 15% by weight of fillers (solids) relative to the total weight of the dispersion, the adhesive composition may comprise from 0.5% to 10%, preferentially from 1% to 8%, very preferentially from 1% to 5%, by weight of an aqueous dispersion of lightened fillers having a bulk density of less than or equal to 0.1 g/cm$^3$, relative to the total weight of the adhesive composition.

The second lightened filler, if present, has a bulk density of greater than 0.1 and less than or equal to 0.95 g/cm$^3$; preferentially from 0.15 to 0.70 g/cm$^3$; very preferentially from 0.20 to 0.50 g/cm$^3$. For example, the bulk density of the second lightened filler may be greater than 0.1 and less than or equal to 0.2 g/cm$^3$; or from 0.2 to 0.3 g/cm$^3$; or from 0.3 to 0.4 g/cm$^3$; or from 0.4 to 0.5 g/cm$^3$; or from 0.5 to 0.6 g/cm$^3$; or from 0.6 to 0.7 g/cm$^3$; or from 0.7 to 0.8 g/cm$^3$; or from 0.8 to 0.9 g/cm$^3$; or from 0.9 to 0.95 g/cm$^3$.

The second lightened filler, if present, may be chosen from expanded perlite, expanded vermiculite, silica aerogels, expanded polystyrene, cenospheres (fillites), hollow alumina beads, expanded clays, pumices, hollow glass beads or expanded glass granules, silicate foam grains, rhyolite or mixtures thereof; preferentially from expanded perlites, hollow glass beads or mixtures thereof; very preferentially from hollow glass beads.

The second lightened filler, if present, may be chosen from hollow microspheres having a bulk density of greater than 0.1 and less than or equal to 0.95 g/cm$^3$; preferentially from 0.15 to 0.70 g/cm$^3$; very preferentially from 0.20 to 0.50 g/cm$^3$.

The hollow microspheres may be expandable hollow microspheres, non-expandable hollow microspheres or mixtures thereof. These hollow microspheres may be obtained from silica glass; preferentially these hollow microspheres may comprise silicon oxide, aluminum oxide, potassium oxide, sodium oxide or mixtures thereof.

For example, hollow microspheres obtained from silica glass are commercially available under the name Sil Cell® by Silbrico.

The adhesive composition preferably comprises from 0.075% to 6.5%; very preferentially from 0.15% to 5.2%; more preferentially from 0.15% to 3.75% by weight of solids of total lightened fillers relative to the total weight of the composition. The term "total lightened fillers" means lightened fillers having a bulk density of less than or equal to 0.1 g/cm$^3$ and, if present, second lightened fillers.

When the adhesive composition comprises a second lightened filler, this composition may comprise a solids mass ratio of the first lightened filler to the total lightened fillers (first and second lightened fillers) of from 5:100 to 40:100, preferentially from 5:100 to 30:100. For example, the adhesive composition may comprise a ratio of the first lightened filler to the total lightened fillers of from 5:100 to 10:100; or from 10:100 to 15:100; or from 15:100 to 20:100; or from 20:100 to 25:100; or from 25:100 to 30:100; or from 30:100 to 35:100; or from 35:100 to 40:100.

Tackifying Resin

The adhesive composition according to the invention also comprises from 6% to 30% by weight of at least one tackifying resin relative to the total weight of the adhesive composition. The tackifying resin makes it possible to improve the trapping nature of the adhesive. This allows the materials to be held together better as soon as they are assembled so that they do not slip or move relative to each other. Thus, the adhesive film remains continuous and immobile during the setting time and the bond does not open.

The resin may be chosen from:
resins obtained by polymerization of terpene hydrocarbons and phenols, in the presence of Friedel-Crafts catalysts (such as Dertophene® 1510 resin available from the company DRT having a molar mass of about 870 Da, Dertophene® H150 available from the same company having a molar mass of about 630 Da, Sylvarez@ TP 95 available from the company Arizona Chemical having a molar mass of about 1200 Da);

resins obtained by polymerization of α-methylstyrene such as the resin Norsolene@ W100, available from the company Cray Valley, which is obtained by polymerization of α-methylstyrene without the action of phenols, with a number-average molar mass of 900 Da; Sylvarez@ 510, which is also available from the company Arizona Chemical, with a molar mass of about 1740 Da, the process for the production of which also comprises the addition of phenols;

rosins of natural or modified origin, and hydrogenated, dimerized, polymerized or esterified derivatives thereof with monoalcohols or polyols (such as Sylvalite® RE 100 resin, which is an ester of rosin and pentaerythritol available from the company Arizona Chemical and has a molar mass of about 1700 Da);

resins obtained by hydrogenation, polymerization or copolymerization of mixtures of unsaturated aliphatic hydrocarbons containing about 5, 9 or 10 carbon atoms obtained from petroleum cuts;

terpene resins;

copolymers based on natural terpenes; and acrylic resins having a viscosity at 100° C. of less than 100 Pa·s.

In a particular embodiment, the resin is chosen from rosins of natural or modified origin, and hydrogenated, dimerized, polymerized or esterified derivatives thereof with monoalcohols or polyols (such as Sylvalite® RE 100 resin which is an ester of rosin and pentaerythritol available from the company Arizona Chemical and having a molar mass of about 1700 Da).

The adhesive composition preferentially comprises from 6% to 30%; very preferentially from 8% to 20%; more preferentially from 10% to 14% by weight of tackifying resin relative to the total weight of the composition. For example, this content may be 6 to 8%; or 8 to 10%; or 10 to 14%; or 14 to 20%; or 20 to 25%; or 25 to 30% by weight of tackifying resin relative to the total weight of the adhesive composition.

Carbonate Filler

The adhesive composition according to the invention also comprises from 15% to 60% by weight of a carbonate filler relative to the total weight of the adhesive composition. The incorporation of carbonate fillers is advantageous in that they have low oil absorption (about 12 g/100 g), which avoids problems of stability of the adhesive composition. The carbonate filler differs notably from the lightened fillers described above in that it has a bulk density of greater than 0.95 g/cm$^3$; preferentially from 1.1 to 1.9 g/cm$^3$; very preferentially from 1.3 to 1.7 g/cm$^3$.

The carbonate filler may be chosen from alkali metal or alkaline-earth metal carbonates; preferentially from calcium carbonate and magnesium carbonate; very preferentially calcium carbonate.

The adhesive composition preferentially comprises from 25% to 50%; very preferentially from 35% to 45%, by weight of carbonate filler relative to the total weight of the composition. For example, the adhesive composition may comprise from 15 to 20%; or from 20% to 25%; or from 25% to 30%; or from 30% to 35%; or from 35% to 40%; or from 40% to 45%; or from 45% to 50%; or from 50% to 55%; or from 55% to 60% by weight of carbonate filler relative to the total weight of the adhesive composition.

The mean particle size of the carbonate filler may be from 1 to 100 μm; preferentially from 1 to 50 μm; very preferentially from 3 to 20 μm.

The adhesive composition is preferentially free of fillers other than the carbonate fillers and lightened fillers described above. In a particular embodiment, the adhesive composition is free of fillers having a bulk density of greater than 0.95 g/cm$^3$ other than carbonate fillers. The adhesive composition is preferentially free of fillers having a bulk density of greater than 0.95 g/cm$^3$ chosen from sand, alumina, hydrated alumina, magnesium silicate, aluminum silicate, sodium silicate, potassium silicate, mica, silica and mixtures thereof.

The adhesive composition may comprise a weight ratio of the lightened fillers to the total fillers (including lightened fillers and carbonate fillers) of from 1:100 to 15:100; preferentially from 1:100 to 10:100.

Water

The adhesive composition may also comprise water. The water may be provided by the polymer composition, by any other aqueous dispersion (e.g., the aqueous dispersion of the lightened filler having a bulk density of less than or equal to 0.1 g/cm$^3$), or by optional addition of water. The addition of water may makes it possible to obtain the desired concentration of active materials.

The composition may comprise from 15% to 40%; preferentially from 20% to 35%; very preferentially from 20% to 30% by weight of water relative to the total weight of the adhesive composition. For example, the adhesive composition may comprise from 15% to 20%; or from 20% to 25%; or from 25% to 30%; or from 30% to 35%; or from 35% to 40% by weight of water relative to the total weight of the adhesive composition.

Thickener

The adhesive composition according to the invention may also comprise at least one thickener. The thickener may notably make it possible to keep the fillers in suspension.

The thickener may be chosen from associating or associative thickeners or mixtures thereof.

The adhesive composition may comprise from 0.1% to 1%; preferentially from 0.1% to 0.5% by weight of the thickener relative to the total weight of the adhesive composition.

When the composition comprises a thickener, it may also comprise a base. The base can improve the effectiveness of the thickener. For example, the base may be triethanolamine.

The adhesive composition according to the invention may comprise from 0.2% to 2%; preferentially from 0.5% to 1.5% by weight of base relative to the weight of the thickener.

Plasticizer

The adhesive composition according to the invention may also comprise a plasticizer.

As examples of plasticizers that may be used, mention may be made of any plasticizer usually used in the field of adhesives, mastics and/or surface coverings, for instance phthalates, benzoates, trimethylolpropane esters, trimethylolethane esters, trimethylolmethane esters, glycerol esters, pentaerythritol esters, naphthenic mineral oils, adipates, cyclohexyldicarboxylates, liquid paraffins, natural oils (optionally epoxidized), polypropylenes, polybutylenes, hydrogenated polyisoprenes, and mixtures thereof.

Among the phthalates, examples that may be mentioned include diisononyl phthalate, diisobutyl phthalate, dioctyl phthalate, dicyclohexyl phthalate, diisooctyl phthalate, diisododecyl phthalate, dibenzyl phthalate, diisodecyl phthalate (for example sold by BASF under the name Palatinol™ DIDP), or butyl benzyl phthalate.

Among the benzoates, examples that may be mentioned include: neopentyl glycol dibenzoate (available, for example, under the name Uniplex® 512 from Lanxess), dipropylene glycol dibenzoate (available, for example, under the name Benzoflex® 9-88SG from Eastman), a mixture of diethylene glycol dibenzoate and of dipropylene glycol dibenzoate (available, for example, under the name K-Flex® 850 S from Kalama Chemical), or a mixture of diethylene glycol dibenzoate, dipropylene glycol dibenzoate and triethylene glycol dibenzoate (available, for example, under the name Benzoflex® 2088 from Eastman).

Among the pentaerythritol esters, examples that may be mentioned include pentaerythrityl tetravalerate (available, for example, under the name Pevalen™ from the company Perstorp).

Among the cyclohexanedicarboxylates, an example that may be mentioned is diisononyl 1,2-cyclohexanedicarboxylate (available, for example, under the name Hexamoll Dinch® from BASF).

Other plasticizers may be triethylene glycol 2-ethylhexanoate (Oxsoft 3G8) and butyldiglycol acetate (BDGA).

The adhesive composition may comprise from 0.1% to 10%; preferentially from 0.5% to 5% by weight of plasticizer relative to the total weight of the composition.

Additives

The adhesive composition according to the invention may also comprise at least one additive; preferentially an additive chosen from solvents, pigments, moisture absorbers, UV stabilizers (or antioxidants), dispersants, molecular sieves, antifoams, fluorescent materials, biocides, an additional polymer other than the polymers described above and mixtures thereof.

The composition may comprise from 0.01% to 10% by weight of additives relative to the total weight of the composition.

The solvent may be a solvent that is volatile at 23° C.; very preferentially an alcoholic solvent that is volatile at 23° C.; more preferentially a solvent chosen from ethanol, isopropanol or mixtures thereof. The volatile solvent notably makes it possible to reduce the viscosity of the adhesive composition and to facilitate its application. The volatile nature of the solvent notably allows the adhesive furrows, obtained after curing of the adhesive composition, to no longer contain solvent. Thus, the solvent has, for example, no negative effect on the hardness of the joint.

The pigments may be organic or inorganic pigments. For example, the pigment is titanium dioxide $TiO_2$, in particular Kronos® 2059 sold by the company Kronos.

The moisture absorber may be chosen from nonpolymeric hydrolyzable alkoxysilane derivatives, with a molecular mass of less than 500 g/mol; preferentially from trimethoxysilane and triethoxysilane derivatives. Such an agent may typically extend the shelf life of the composition during storage and transportation before it is used. Mention may be made, for example, of γ-methacryloxypropyltrimethoxysilane (for example available, under the trade name Silquest® A-174, from the company Momentive), methacryloxymethyltrimethoxysilane (for example available, under the name Geniosil® XL33, from Wacker), vinyltrimethoxysilane, isooctyltrimethoxysilane or phenyltrimethoxysilane.

The UV stabilizers (or antioxidants) are typically introduced to protect the composition from degradation resulting from a reaction with oxygen which is liable to be formed by the action of heat or light. These compounds may include primary antioxidants which trap free radicals. The primary antioxidants may be used alone or in combination with other secondary antioxidants or UV stabilizers. Examples that may be mentioned include Irganox® 1010, Irganox® B561, Irganox® 245, Irgafos® 168, Tinuvin® 328 or Tinuvin™ 770 sold by BASF.

The additional polymer may be a copolymer comprising at least one (meth)acrylate or (meth)acrylic monomer and at least one styrene monomer, and having a glass transition temperature (Tg) of from 0 to 40° C.; preferentially from 10 to 30° C.

Bulk Density

The bulk density of the fillers and of the composition is described above. The bulk density is defined as the ratio between the mass of the material and the apparent volume of all the grains. The bulk density is expressed in $g/cm^3$.

The density is measured using fillers/composition in powder form. The fillers in powder form are dry extracts. The term "dry extract" means a material with a residual moisture content of substantially 0%.

The bulk density may be measured according to the following procedure:
- a calibrated cup with a volume of about V=500 mL (mass of the cup Mo=500 g) is placed in an upright position under a stainless-steel funnel with a volume of about 600 mL;
- the hollow bottom of the funnel is closed with a slide, the slide being used to open and close the hollow bottom of the funnel;
- the funnel is completely filled with the homogenized filler(s) and the slide is quickly removed, thus allowing the filler(s) to flow into the cup;
- the excess fillers is slowly smoothed out with a flat ruler (an equivalent instrument may be suitable), and the outside of the cup is carefully cleaned with a dry cloth (a brush may be used); and
- the cup is placed on a 0.1 g analytical balance and the cup and its contents, mass M1, are weighed with an accuracy of 0.1 g.

In a particular embodiment, the adhesive composition comprises a lightened filler having a bulk density of from 0.01 to 0.1 $g/cm^3$, optionally a second lightened filler having a bulk density of from 0.15 to 0.70 $g/cm^3$, and a carbonate filler having a bulk density of from 1.1 to 1.9 $g/cm^3$.

In a very particular embodiment, the adhesive composition comprises a lightened filler having a bulk density of from 0.01 to 0.07 $g/cm^3$, optionally a second lightened filler having a bulk density of from 0.20 to 0.50 $g/cm^3$, and a carbonate filler having a bulk density of from 1.3 to 1.7 $g/cm^3$.

The adhesive composition according to the invention preferably has a bulk density (solids) of from 0.7 to 1.1 $g/cm^3$; preferentially from 0.8 to 1.1 $g/cm^3$; very preferentially from 0.9 to 1.1 $g/cm^3$. For example, the bulk density of the adhesive composition may be from 0.7 to 0.8 $g/cm^3$; or from 0.8 to 0.9 $g/cm^3$; or from 0.9 to 1.0 $g/cm^3$; or from 0.9 to 1.1 $g/cm^3$.

Viscosity

The adhesive composition according to the invention may have a viscosity of from 10 000 mPa·s to 45 000 mPa·s; preferentially from 20 000 to 35 000 MPa·s. This viscosity is measured using a Brookfield type viscometer using a No. 6 spindle at a speed of 20 rpm at room temperature (about 20° C.) and at atmospheric pressure. For example, the viscosity of the adhesive composition may be from 10 000 mPa·s to 15 000 mPa·s; or from 15 000 mPa·s to 20 000 mPa·s; or from 20 000 mPa·s to 25 000 mPa·s; or from 25 000 mPa·s to 30 000 mPa·s; or from 30 000 mPa·s to 35 000 mPa·s; or from 35 000 mPa·s to 40 000 mPa·s; or from 40 000 mPa·s to 45 000 mPa·s.

ONE-Component or Two-Component Adhesive Composition

The adhesive composition according to the invention may be a one-component composition, i.e. an adhesive composition in which all the compounds are packaged in the same compartment. In this case, the composition is preferably ready to use and the user (private individual or professional) can apply it directly to the substrate to be covered and/or the flexible surface covering to be laid, without having to perform any prior mixing.

Alternatively, the adhesive composition may be a two-component composition, i.e. an adhesive composition in which the components are packaged in at least two separate compartments.

In this case, the two-component composition may comprise a component A and a component B, the two components being mixed prior to use and application of the adhesive composition to a substrate and/or a flexible surface covering, for example. The materials described above may be distributed in component A and/or component B of the two-component composition. For example, component A may comprise the polymer composition, lightened fillers and carbonate fillers. Component B may comprise the tackifying resin and also the optional additives.

Process for Applying a Surface Covering

In a second aspect, the present invention relates to a process for applying a flexible surface covering to a substrate, said process comprising the following steps:
applying a layer of the adhesive composition as described above to the substrate and/or the flexible surface covering; and
applying the flexible surface covering to the substrate.

The adhesive composition according to the invention is advantageous in that it provides satisfactory adhesion with an application rate that is at least 10%; preferentially at least 15%; lower than that of a standard adhesive composition applied generally in an amount of about 300 g/m$^2$, without compromising the gumming time, the open time or the peel performance. The gumming time is the incompressible time period between the application of the adhesive composition to the substrate and the application of the flexible surface covering to the adhesive layer. The gumming time is preferentially 30 minutes or less at room temperature (20° C.) and 50% humidity.

The "open time" refers to the time period during which there is transfer of adhesive between the adhesive layer and the flexible surface covering. The open time is preferentially from 40 to 50 minutes at room temperature (20° C.) and 50% humidity.

In a particular embodiment, an amount of adhesive composition of less than or equal to 290 g/m$^2$ is applied; preferentially less than or equal to 280 g/m$^2$; very preferentially less than or equal to 270 g/m$^2$. For example, an effective application of adhesive composition may be achieved by using a TKB type 1A2 spatula.

The layer of adhesive composition may be applied continuously or discontinuously to the substrate and/or the flexible surface covering. The layer of adhesive composition is preferentially applied to the substrate.

The substrate is generally not primed prior to application of the layer of adhesive composition. For example, a floor tile is simply stripped before the layer of adhesive composition is applied. The substrates are those mentioned in the standard DTU 53.1.

The composition may be applied at a temperature ranging from 5° C. to 40° C. and preferentially between 15° C. and 30° C.

Flexible Surface Coverings

The flexible surface covering may be applied after observing a gumming time of 30 minutes or less, for example from 10 to 30 minutes, depending on the environmental conditions. The gumming time corresponds to the period of time during which the applied adhesive composition thickens and its adhesive strength increases.

The flexible surface coverings used in the invention are those that meet the conditions set forth in the standards DTU 53.1 and 53.2.

The flexible surface coverings may be chosen from knitted, tufted, woven and flocked carpeting, in strips or tiles, notably those which meet the requirements of NF EN 1307, and also needle-punched floor coverings in strips or tiles, notably those which meet the requirements of NF EN 1470 and prEN 13297. Mention may be made of conventional wool or synthetic carpeting, and natural fiber coverings.

The flexible surface coverings may also be polymeric floor coverings, e.g. polyvinyl chloride (PVC) or other. Examples that may be mentioned include the following (see the standard DTU 53.2): homogeneous and heterogeneous polyvinyl chloride floor coverings; floor coverings based on polyvinyl chloride on a jute or polyester backing or on a polyester backing with polyvinyl chloride backing; floor coverings based on polyvinyl chloride on foam; floor coverings based on polyvinyl chloride with a cork backing; floor coverings based on expanded polyvinyl chloride; semi-flexible tiles based on polyvinyl chloride; agglomerated cork tiles with a wear layer based on polyvinyl chloride; or flexible coverings based on polymers of renewable origin (notably of agricultural origin) such as PLA (polylactic acid) or polyolefin (the olefin being derived notably from bio-ethanol) polymers.

A large number of different coverings may thus be used in the invention, for example the following coverings: homogeneous PVCs (tiles or strips); multilayer PVCs (tiles or strips); PVCs on cork; polyolefins; linoleum in strips; rubber in tiles or strips; relief expanded vinyls (R.E.V.); semi-flexible tiles; needlepunched with or without backing; carpeting with a foam backing (latex); carpeting with a non-woven backing; carpeting with a synthetic backing (Action Back type); or coir, sisal and sea rush matting with a latex backing. In order to apply the covering under the best conditions and to avoid disorders, it is recommended to refer to the manufacturers' laying guides for the various covering techniques.

Substrate to be Covered

The substrate to be covered, in particular the floor, may correspond to any conventional substrate that may be covered with a flexible surface covering, and may notably comprise materials chosen from concrete, mortar, brick, glass, metal, wood, plastic or combinations thereof. Examples that may be mentioned include surfaced concretes (notably surfaced with a neat facing), cement-based screeds (incorporated or added), anhydrite screeds, preexisting floor tiles, old parquet floors that have been suitably smoothed, particleboard or plywood, and conventional wall facings. The preparation of the supports and the implementation conditions must be performed in accordance with the professional regulations in force in the country concerned.

Process for Manufacturing the Adhesive Composition

In a third aspect, the present invention relates to a process for manufacturing the adhesive composition by simply mixing the materials, namely the polymer composition, the lightened fillers, the carbonate fillers and the tackifying resin and any additional materials.

The adhesive composition may be manufactured by premixing the polymer composition, the carbonate fillers, the tackifying resin and any additional materials, followed by adding the lightened fillers to the premix obtained. After manufacture, the adhesive composition is stored protected from light and air at a temperature of from 5 to 40° C.; preferentially from 10 to 30° C.

Combination (Kit) of a Flexible Surface Covering and an Adhesive Composition

In a fourth aspect, the present invention relates to the combination of a flexible surface covering as described above with the adhesive composition as described above. Specifically, it may be judicious to combine in a kit intended for users (professionals or private individuals) a flexible surface covering and an adhesive composition in amounts that are suitable for the surface to be covered.

Use of the Adhesive Composition

In a fifth aspect, the present invention relates to the use of the adhesive composition for applying a flexible surface covering to a substrate as described above; preferentially for applying to a floor a flexible surface covering chosen from polymeric coverings or carpeting.

The flexible surface coverings used in the invention are those that meet the conditions set forth in the standards DTU 53.1 and 53.2.

The flexible surface coverings may be chosen from knitted, tufted, woven and flocked carpeting, in strips or tiles, notably those which meet the requirements of NF EN 1307, and also needle-punched floor coverings in strips or tiles, notably those which meet the requirements of NF EN 1470 and prEN 13297. Mention may be made of conventional wool or synthetic carpeting, and natural fiber coverings.

Examples

The following examples illustrate the invention without limiting it. In a first stage, five compositions (A to E) were prepared with the following materials:
   Polymer composition 1: Acrylic dispersion (60% solids) of an acrylic ester copolymer having a glass transition temperature of −22° C.;
   Polymer composition 2: Acrylic dispersion (50% solids) of an acrylic ester copolymer having a glass transition temperature of −22° C.;
   Additional polymer: Aqueous dispersion of a styrene-acrylic copolymer with a glass transition temperature of 20° C. and a solids content of about 50%;
   Tackifying resins: rosin resins
   first lightened fillers: Aqueous dispersion (15% solids) of Expancel® thermoplastic microspheres from Nouryon with a bulk density (solids) of about 0.036 g/m³ and a D50 of 35 µm;
   second lightened filler: Sil Cell® alumina silicate microspheres from Silbrico with a bulk density (solids) of about 0.15 g/m³ and a D50 of 40 µm;
   Carbonate filler 1: Carbonate with a D50 of 14 µm;
   Carbonate filler 2: Carbonate with a D50 of 5 µm.
   Composition A (reference) and compositions B to E (invention) have the following formulations:

TABLE 1

| Formulations (materials in mass %) | A | B | C | D | E |
|---|---|---|---|---|---|
| Polymer comp. 1 | 9.50 | 9.50 | 9.50 | 9.50 | 9.50 |
| Polymer comp. 2 | 8.00 | 8.00 | 8.00 | 8.00 | 8.00 |
| Additional polymer | 3.00 | 3.00 | 3.50 | 3.50 | 3.50 |
| Tackifying resins | 12.00 | 12.00 | 12.00 | 12.00 | 12.00 |
| Carbonate filler 1 | 26.00 | 24.00 | 23.00 | 23 | 23 |
| Carbonate filler 2 | 14.00 | 13.00 | 11.00 | 12 | 12 |
| First lightened filler (15%) | — | 3.00 (0.45) | 1.50 (0.225) | 1.50 (0.225) | 2.00 (0.30) |
| Second lightened filler | — | — | 2.00 | 2.50 | 1.00 |
| Plasticizers | 3.15 | 3.15 | 3.15 | 2.15 | 2.15 |
| Thickener | 0.60 | 0.60 | 0.70 | 0.70 | 0.80 |
| Antifoam | 0.20 | 0.20 | 0.20 | 0.20 | 0.00 |
| Filler dispersant | 0.40 | 0.40 | 0.50 | 0.40 | 0.40 |
| Base | 0.80 | 0.80 | 0.90 | 0.90 | 1.00 |
| Wetting agent | 0.40 | 0.40 | 0.40 | 0.40 | 0.40 |
| Stabilizer | — | — | — | 0.30 | 0.30 |
| Emulsifier | — | — | — | — | 0.50 |
| Biocides | 0.10 | 0.10 | 0.10 | 0.10 | 0.10 |
| Water | qs | qs | qs | qs | qs |
| Parameters | | | | | |
| Bulk density | 1.4 | 1.06 | 1.04 | 0.97 | 0.95 |
| Viscosity (mPa · s in 6V20) | 38 000 | 35 000 | 37 000 | 33 000 | 31 000 |
| Stability | Yes | Yes | Yes | Yes | Yes |
| Consumption (g/m²) | 300 | 240 | 220 | 222 | 212 |
| Gumming time (min) | 20 | 10 | 20 | 20 | 20 |
| Open time (min) | 50 | 40 | 60 | 50 | 60 |
| Trapping agent | 3 | 3 | 3 | 3 | 3 |
| Peeling (N/mm) | 1.5 | 1.62 | 1.46 | 1.45 | 1.65 |

Compositions A to E were applied with a notched spatula of 1A2 type on a cardboard support of dimensions 1200 mm×800 mm and covered with a levelling coat. The conditions during the application of the compositions were temperature (23±3° C.) and relative humidity (50±10) %. At the end of the application of each composition, the timer was started.

Compositions B to E show improved application efficiency relative to composition A, in particular with a reduction in consumption (g/m²) of at least 10%. In addition to the performance results relating to adhesion and application efficiency, compositions B to E also showed good ease of application, in particular D and E. In addition, these compositions maintain satisfactory application and performance features.

The invention claimed is:

1. An adhesive composition, for applying a flexible surface covering to a substrate, comprising, relative to the total weight of the adhesive composition:
   from 10% to 40% by weight of solids of a polymer composition comprising at least one copolymer or a mixture of at least two polymers comprising at least one (meth)acrylate or (meth)acrylic monomer;
   from 0.075% to 1.5% by weight of solids of at least one lightened filler having a bulk density of less than or equal to 0.1 g/cm³;
   optionally at least a second lightened filler having a bulk density of greater than 0.1 g/cm³ and less than or equal to 0.95 g/cm³;
   from 15% to 60% by weight of at least one carbonate filler; and
   from 6% to 30% by weight of at least one tackifying resin.

2. The adhesive composition as claimed in claim 1, comprising from 15% to 35% by weight of solids, of the polymer composition.

3. The adhesive composition as claimed in claim 1, in which the polymer composition comprises from 35% to 70% by weight of a copolymer or a mixture of at least two polymers comprising at least one (meth)acrylate or (meth)acrylic monomer, relative to the total weight of the polymer composition.

4. The adhesive composition as claimed in claim 1, in which the lightened fillers are hollow, nonporous, water-dispersible microspheres having a mean particle size (D50) of from 1 to 100 µm.

5. The adhesive composition as claimed in claim 1, in which the lightened fillers having a bulk density of less than or equal to 0.1 g/cm$^3$ are hollow microspheres obtained from a thermoplastic material.

6. The adhesive composition as claimed in claim 1, in which the second lightened fillers, having a bulk density of greater than 0.1 g/cm$^3$ and less than or equal to 0.95 g/cm$^3$, are hollow microspheres obtained from silica glass.

7. The adhesive composition as claimed in claim 1, in which the tackifying resin is chosen from rosins or modified derivatives of rosins, wherein the modified derivatives of rosins comprise hydrogenated rosins, dimerized rosins, polymerized rosins or esterified derivatives of rosins with monoalcohols or polyols.

8. The adhesive composition as claimed in claim 1, in which the carbonate filler has a bulk density of greater than 0.95 g/cm$^3$.

9. The adhesive composition as claimed in claim 1, in which the carbonate filler is chosen from alkali metal or alkaline-earth metal carbonates.

10. The adhesive composition as claimed in claim 1, comprising a mass ratio of the lightened fillers to the total fillers of from 1:100 to 15:100.

11. The adhesive composition as claimed in claim 1, further comprising a thickener, a plasticizer, a solvent, a pigment, a moisture absorber, a UV stabilizer, a dispersant, a molecular sieve, an antifoam, a fluorescent material, a biocide, or mixtures thereof.

12. The adhesive composition as claimed in claim 1, having a viscosity of from 10 000 mPa·s to 45 000 mPa·s.

13. A process for applying a flexible surface covering to a substrate, comprising the following steps:
    applying a layer of the adhesive composition, as claimed in claim 1, to the substrate and/or the flexible surface covering; and
    applying the flexible surface covering to the substrate.

14. The process for applying a flexible surface covering to a substrate as claimed in claim 13, in which an amount of the adhesive composition of less than or equal to 290 g/m$^2$ is applied.

15. The adhesive composition as claimed in claim 1, comprising at least a second lightened filler having a bulk density of greater than 0.1 g/cm$^3$ and less than or equal to 0.95 g/cm$^3$.

* * * * *